Figure 1:
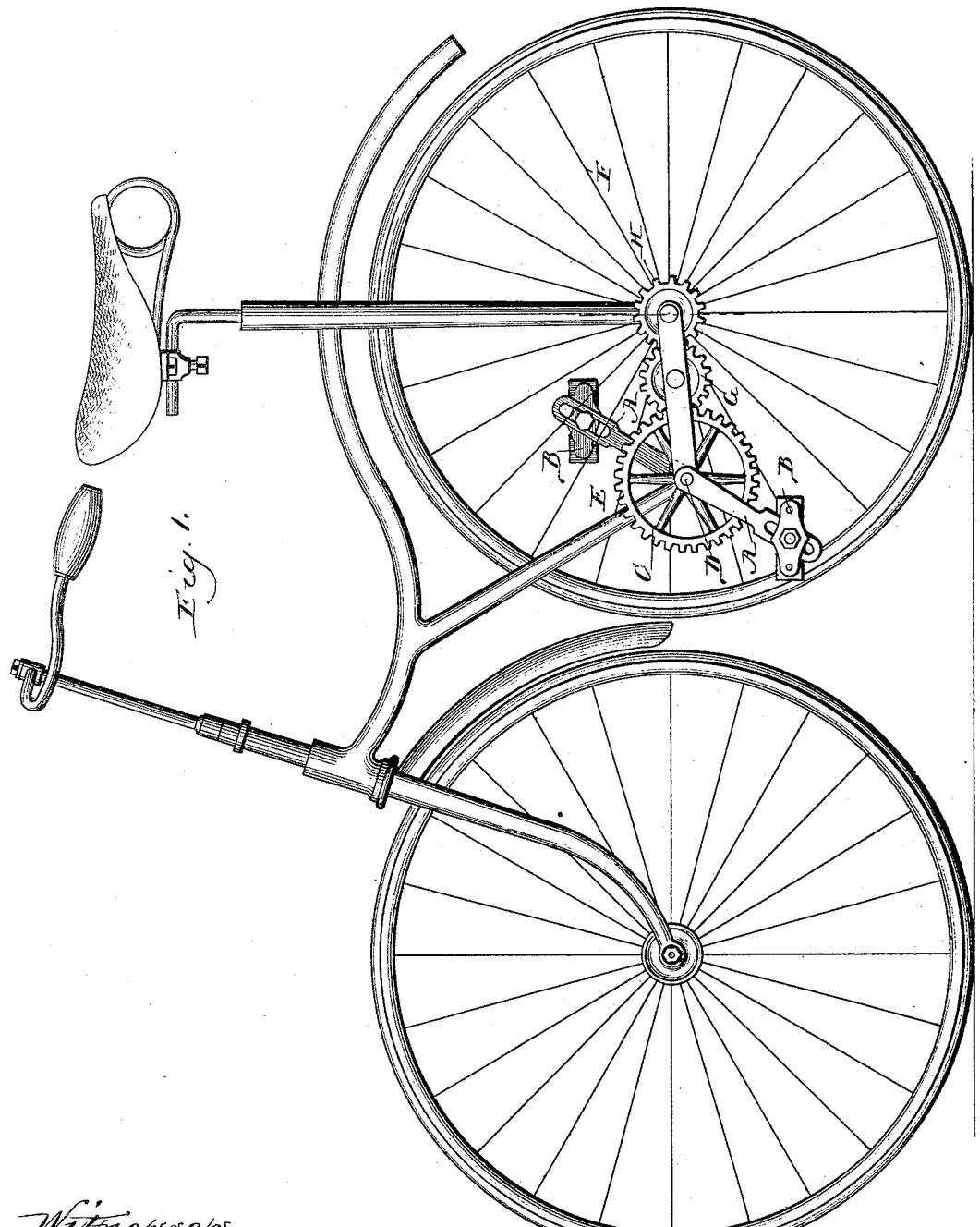

(No Model.) C. E. McGLINCHEY. 2 Sheets—Sheet 1.
VELOCIPEDE.

No. 445,125. Patented Jan. 20, 1891.

Witnesses
W. Rissler
O. R. Barnett

Inventor
C. E. McGlinchey
By Raymond & Veeder
Attys (No Model.) 2 Sheets—Sheet 2.
C. E. McGLINCHEY.
VELOCIPEDE.
No. 445,125. Patented Jan. 20, 1891.
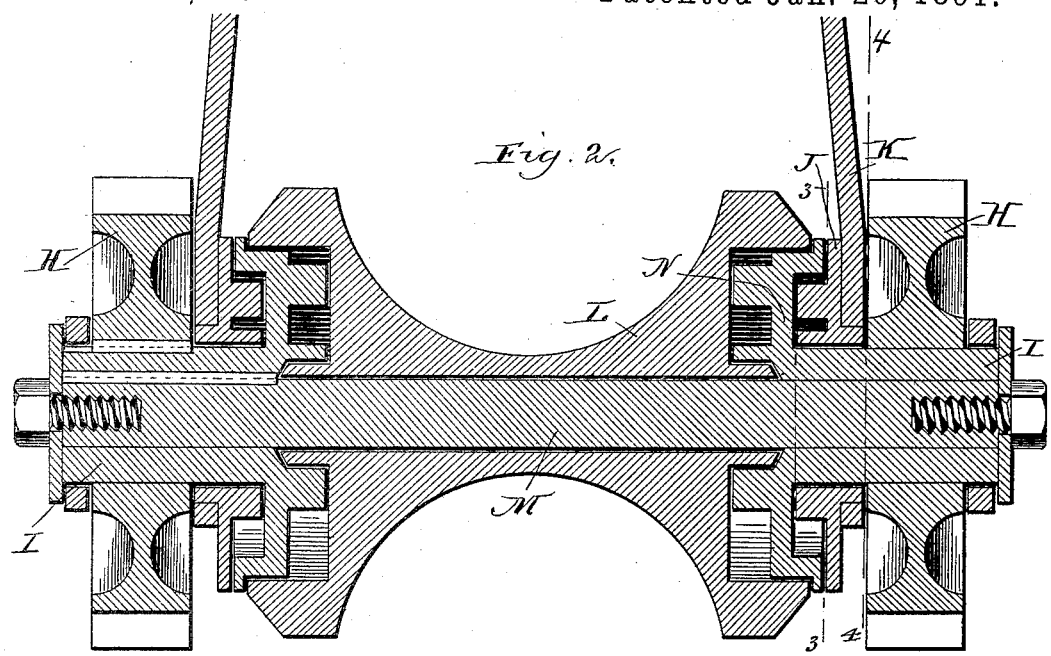
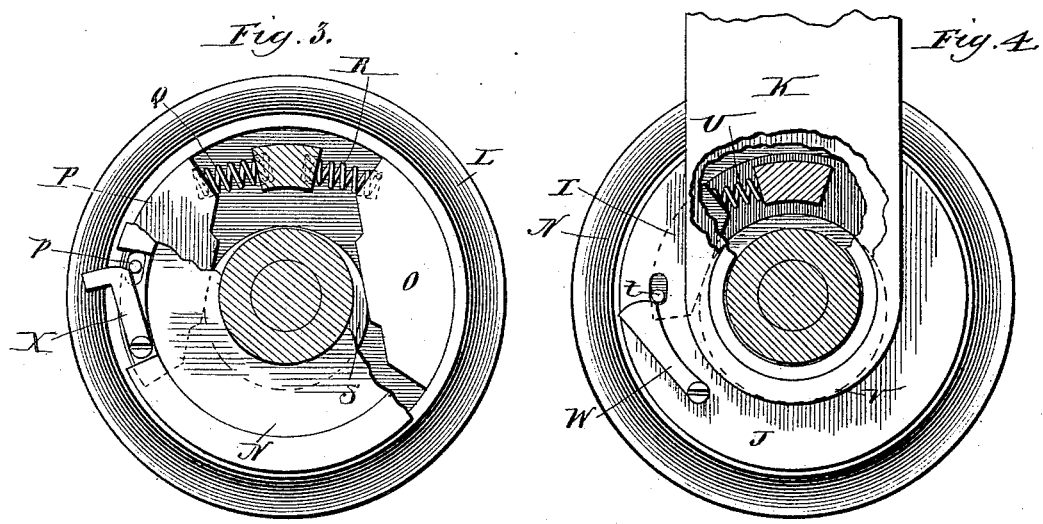
Witnesses
W. Rossiter
O. R. Barnett
Inventor
C. E. McGlinchey
By Raymond & Veeder
Attys

UNITED STATES PATENT OFFICE.

CHARLES E. McGLINCHEY, OF CHICAGO, ILLINOIS, ASSIGNOR OF TWO-THIRDS TO CHARLES H. DUNHAM AND FRANK BRADY, BOTH OF SAME PLACE.

VELOCIPEDE.

SPECIFICATION forming part of Letters Patent No. 445,125, dated January 20, 1891.

Application filed June 11, 1890. Serial No. 355,042. (No model.)

*To all whom it may concern:*

Be it known that I, CHARLES E. MCGLINCHEY, of Chicago, in the county of Cook and State of Illinois, have invented certain new and useful Improvements in Velocipedes, of which the following is a specification.

The object of my invention is to provide a driving-gear for velocipedes which may be operated by cranks and pedals so connected to the driving-wheel as to revolve continuously when the driving-wheel is in motion, the rider in this case being able to propel the velocipede forward or to apply a retarding force by "back pedaling," as he may desire; or by a slight change in the adjustment my invention provides for the connection of the pedals and cranks to the driving-wheel, so as to permit the pedals to remain at rest, while the driving-wheel revolves, a lock or clutch being provided, so that the pedals cannot revolve backward when the last-mentioned adjustment has been made.

I have shown my invention as applied to a bicycle of the Safety type and have arranged the gearing so as to enable the wheels to be brought closer together than in the ordinary Safety, thereby diminishing the length and weight of the frame.

In the accompanying drawings, Figure 1 is a side elevation of a Safety bicycle having my improved gearing attached. Fig. 2 is a vertical cross-section through the axis of the driving-wheel, showing a portion of said wheel and of the forks and the attached gearing. Figs. 3 and 4 are face views, partly in section, of the clutch mechanism, the section of Fig. 3 being taken on line 3 3, Fig. 2, and of Fig. 4 on line 4 4, both being viewed from the right of Fig. 2.

A A, Fig. 1, are the driving-cranks, having at their outer ends the pedals B B. To each crank is connected a gear C through a shaft D, journaled in the frame E. The gear C is duplicated, one being upon each side of the driving-wheel F, but only one gear shows, as one is immediately behind the other when viewed from the side of the velocipede.

In the remainder of the description only one side of the gearing will be described, the second side being in all respects a duplication of the first. An intermediate gear G connects the gear C to the driving-wheel gear H. The mode of mounting or connecting the last-named gear to the driving-wheel appears in Fig. 2. The gear H is secured to a sleeve I, which is journaled in the clutch-disk J, secured to the fork end K. The wheel-hub L revolves freely upon the pin M, extending through and keyed or otherwise secured to both sleeves I I, and the inner end of the sleeve I is expanded to form a disk N, upon one side of which is mounted clutch mechanism, a face view of which is shown in Fig. 3. The outer side of the disk N is turned to form an annular recess, within which the clutch mechanism, which is attached to the clutch-disk J, enters. Both clutch mechanisms are substantially similar to that shown in my patent No. 408,845, but differs from it in the details hereinafter described.

Instead of employing a single clutch-block O, as in the patent just referred to, I employ two clutch-blocks O P, Fig. 3, mounted upon the inner face of the disk N and adapted to engage the hub L of the driving-wheel. Each of these blocks is provided with springs Q R, which keep them in position for engagement with the hub L and the cam S, so that when both blocks are in operative position the disk N and its attached gear-wheel H are locked to the wheel-hub L, whether the gear H be driven forward or backward.

The clutch mechanism connecting the disk J, secured to the fork end of the disk N, is shown in Fig. 4. It consists of a block T and spring U, engaging with a cam V, and the annular recess, before mentioned, on the outer side of the disk N, so that when in operative position the disk N and the attached gear H are prevented from revolving backward. In the block T is inserted a pin *t*, which projects through a slot in the disk J. Upon the disk J is provided a latch W, which is adapted to engage with the pin *t*. When the latch W is turned to the right, (see Fig. 4,) it pushes the pin *t* and the block T back, so as to prevent the block from engaging with the cam V and the disk N, the latter therefore being able to revolve freely without hinderance from the clutch mechanism.

Upon the block P, Fig. 3, is fixed a pin $p$, with which a latch X, pivoted on disk N, engages, so as to throw block P back from its operative position in the same manner as latch W disengages the block T.

When the rider desires to connect the pedals to the driving-wheel, so that he can exert a force upon the driving-wheel either forward or backward, both blocks O and P are allowed to assume their operative positions, as seen in Fig. 3, the locking-block T being thrown out of its operative position by moving the latch W to the right, so as to permit the disk N and gear H to move freely in either direction. When he desires to permit the driving-wheel to revolve while the pedals are held stationary, he shifts the block P from its operative position by throwing over the latch X, and to prevent the pedals from revolving backward he allows the block T to resume its operative position by releasing the latch W. He has thus under his control two devices, one or the other of which he can use, as circumstances may make most desirable. When on a descending grade or when assisted by the wind, it is advantageous to be able to rest the feet by stopping the pedals while the machine keeps on its way, as an exertion or force at comparatively long intervals is sufficient to maintain speed; but when traversing an undulating road, or when for other reasons it is desirable to have the machine under the best possible control, the ability to back pedal is desirable. By the use of these devices the rider can adjust his machine to suit any set of circumstances he may encounter. When the adjustment of the driving mechanism is such as to permit the pedals to stand still, they serve in place of a step for mounting.

Although Fig. 2 shows a clutch mechanism on each side of the driving-wheel, it is not necessary that there should be more than one, as both driving-gears H are connected by the pin M, and therefore a clutch connected with either serves for both. Greater sureness of action and a lessening of strain, however, result from the employment of two sets of clutches.

I claim—

1. The combination, in a velocipede, of a clutch connecting the driving-wheel and pedals having two gripping devices operative in reverse directions, and a latch or stop adapted to release one of said gripping devices, substantially as described.

2. The combination, in a velocipede, of a clutch connecting the driving-wheel and pedals having two gripping devices operative in reverse directions, a latch or stop adapted to release one of said gripping devices, a clutch secured to the frame of the velocipede and adapted to prevent the backward movement of the pedals, and a latch or stop adapted to release said clutch, substantially as described.

3. The combination, in a velocipede, of a pin on which the driving-wheel may revolve, gears secured on each end of said pin, a clutch connecting said gears and the driving-wheel, and gearing on each side of said driving-wheel connecting the pedal-crank to the first-named gears, substantially as described.

4. The combination, in a velocipede, of a driving-wheel F, revolving freely on the pin M and having a hub L, provided with an annular recess, a disk N entering said recess, provided with clutch-blocks O P and cam S, a pin $p$, projecting from block P, latch X, co-acting with pin $p$, and driving-gears H, connected to the clutch-disks N and to the driving-pedals, substantially as described.

5. The combination, in a velocipede, of a driving-wheel F, revolving freely on the pin M and having a hub L, provided with an annular recess, a disk N entering said recess, provided with clutch-blocks O P and cam S, a pin $p$, projecting from block P, latch X, co-acting with pin $p$, driving-gears H, connected to the clutch-disks N and to the driving-pedals, clutch-disk J, attached to the fork K and provided with clutch-blocks T and cam V, pin $t$, inserted in block T, and latch W, co-acting with pin $t$, substantially as described.

CHARLES E. McGLINCHEY.

Witnesses:
 IRWIN VEEDER,
 TODD MASON.